United States Patent Office 2,709,703
Patented May 31, 1955

---

2,709,703

2-ACETOXYFURAN AND DERIVATIVES THEREOF

Niels Konrad Friedrich Wilhelm Clauson-Kaas, Klampenborg, Denmark, assignor to Kemisk Vaerk Koge A/S, Copenhagen, Denmark, a firm No Drawing. Application May 15, 1951,
Serial No. 226,542

Claims priority, application Denmark May 20, 1950

2 Claims. (Cl. 260—347.4)

This invention relates to 2-acetoxyfuran and to methods of preparing it.

2-acetoxyfuran is a new compound having the formula:

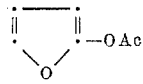

wherein Ac signifies the acetyl group: $CH_3CO$.

2-hydroxyfuran can be converted into other substances such as β-formylpropionic acid which is a useful intermediate in organic chemical syntheses, as in the production of plant hormones.

According to the invention 2,5-diacetoxy-2,5-dihydrofuran (IV) is subjected to pyrolysis. Thereby 2-acetoxyfuran is formed according to the following scheme of reaction:

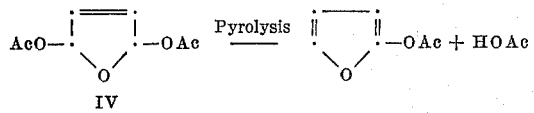

IV

By fractionally distilling the reaction product in vacuum, 2-acetoxyfuran is obtained as a colorless, stable liquid.

By hydrolysis of 2-acetoxyfuran, β-formylpropionic acid is produced in accordance with the following equation:

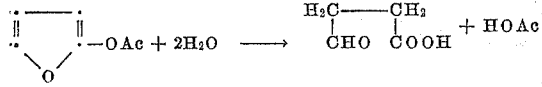

By alcoholysis of 2-acetoxyfuran esters of β-formylpropionic acid are formed according to the following scheme of reaction:

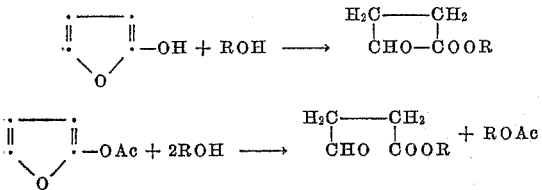

wherein R signifies alkyl.

In the following description the invention is illustrated by specific examples which, however, are in no way to be considered limitative.

*Example 1*

50.0 g. of 2,5-diacetoxy-2,5-dihydrofuran are pyrolysed under 1 mm. in a quartz tube in an apparatus of Bouveault's type, e. g. as described in C. Weygand: Organic Preparation, Interscience Publishers, New York, 1945, p. 144, using a cooling trap as condenser. The temperature of the quartz tube is kept at 480–500° C., and the diacetoxydihydrofuran is kept boiling at such a rate that the temperature at the top of the column remains at 65–70° C. The reaction is stopped after about 2 hours when 8 g. of a black pitchy mass remains in the flask. The cooling-trap contains 38 g. of a partially crystalline produce which melts at room temperature to a pale yellow liquid.

This liquid is distilled under 15 mm. through a small column, and 29 g. of forerun, B. $P_{.15}<65°$ C., are collected. By distilling further without the column, 5.10 g. of diacetoxydihydrofuran is regained.

The 29 g. of forerun are then dissolved in 50 cc. of ether and washed once with 75 cc. of water and then four times with 25 cc. of 2-molar acid potassium carbonate until no more carbon dioxide is evolved. The ethereal solution is then dried over sodium sulphate, the ether evaporated, and the residue distilled in vacuum. The main fraction distills at 49–49.5° C. under 9 mm., yielding 12.0 g. of 2-acetoxyfuran=35%; $n_D^{25}=1.4480$.

$C_6H_6O_3$ (126.1) calc.: C, 57.1; H, 4.8. Found: C, 57.2; H, 4.8.

By boiling 2-acetoxyfuran with an aqueous hydrochloric acid solution of dinitrophenyl hydrazine, the dinitrophenylhydrazone of β-formylpropionic acid is obtained (M. P. 197–203° C.).

By adding 2-acetoxyfuran to an alcoholic sulphuric acid solution of dinitrophenylhydrazine, the dinitrophenylhydrazone of β-formylpropionic acid ethyl ester is formed (M. P. 113–114° C.).

*Example 2*

60.0 g. of 2,5-diacetoxy-2,5-dihydrofuran (bromine-containing product, prepared by the method described in Acta chem. scand. 4 (1950) 1233) is pyrolysed as described in Example 1. 10 g. of a black residue remain in the flask, and 45 g. of a partly crystalline product, collected in the cooling-trap, are distilled through a small column. Forerun 32 g., B. $P_{.15}<65°$ C. Second fraction 6.5 g., B. $P_{.16}=95-97°$ C. 3 g. of a solid black residue remain in the flask.

The 32 g. of forerun are dissolved in 50 cc. of ether and washed, and the ethereal solution dried, evaporated and distilled as described in Example 1, yielding 1.5 g. of 2-acetoxyfuran.

I claim:

1. Method of producing 2-acetoxyfuran comprising the steps of: evaporating 2,5-diacetoxy-2,5-dihydrofuran; subjecting the vapors to a pyrolysis at a temperature between 480 and 500° C.; and fractionally distilling the pyrolysis product.

2. 2-acetoxyfuran.

References Cited in the file of this patent

UNITED STATES PATENTS

| | | |
|---|---|---|
| 2,342,607 | Brunson et al. | Feb. 22, 1944 |
| 2,514,026 | Clauson-Kaas | July 4, 1950 |
| 2,556,325 | Fluchaire et al. | June 12, 1951 |

OTHER REFERENCES

Olsen, Acta Chim. Scand. 4 (1950) 462–472.